Feb. 21, 1956 J. HOHL ET AL 2,735,600
APPARATUS FOR SEALING CONTAINERS
Filed Aug. 13, 1952 10 Sheets-Sheet 2
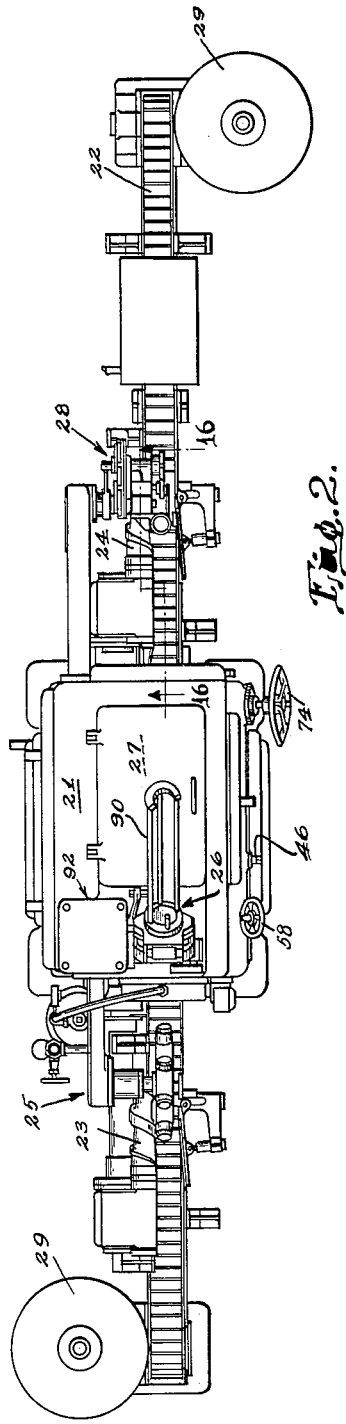
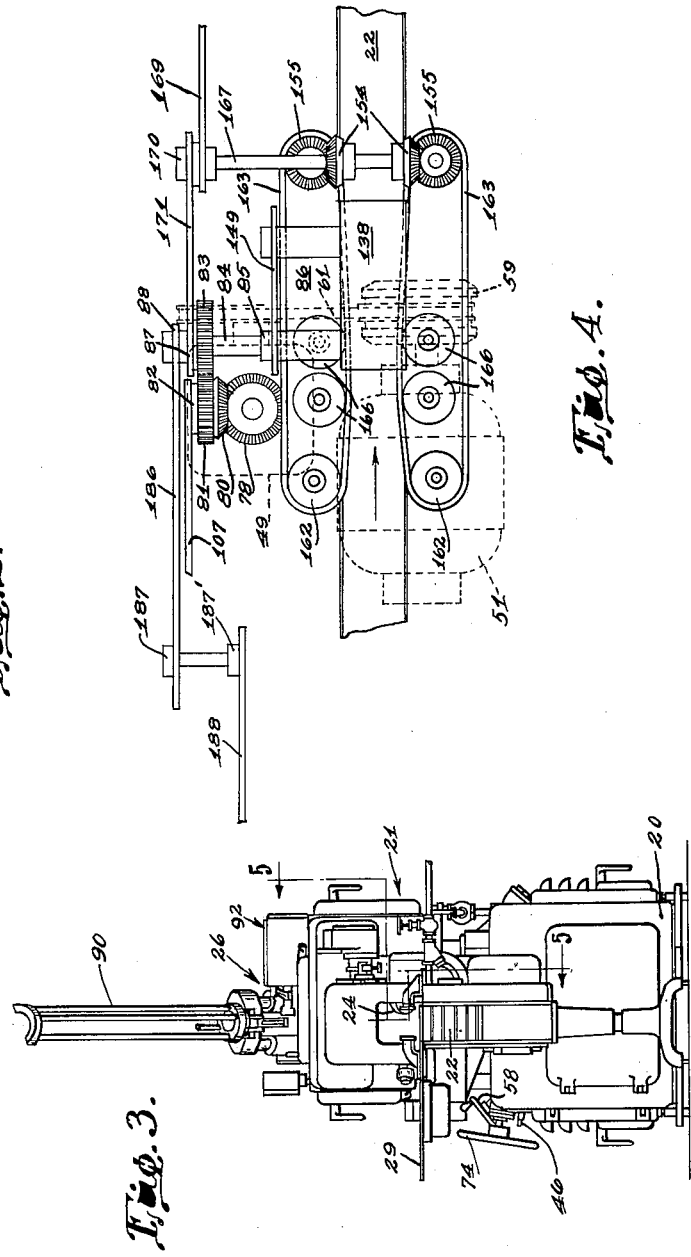
Inventors
JOHN HOHL
OLAV BJERING
WALTER J. RINGEL
By Rule & Hoge
Attorneys

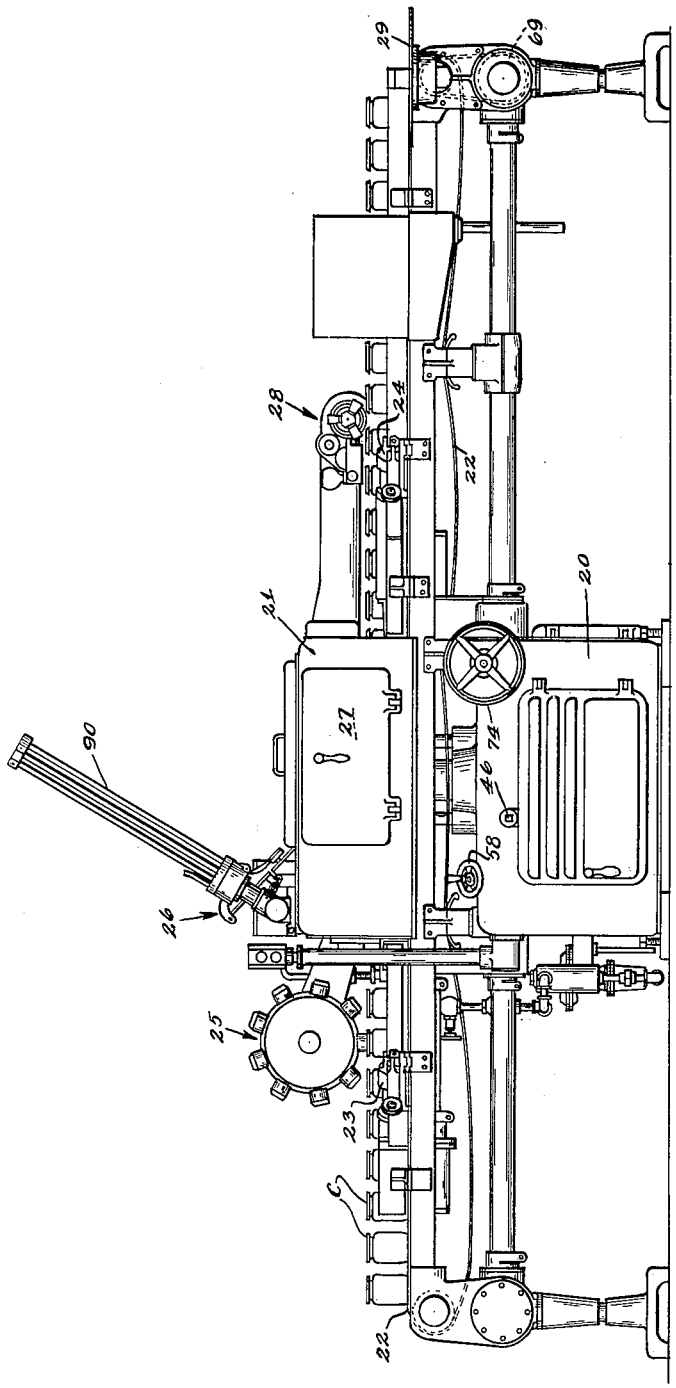

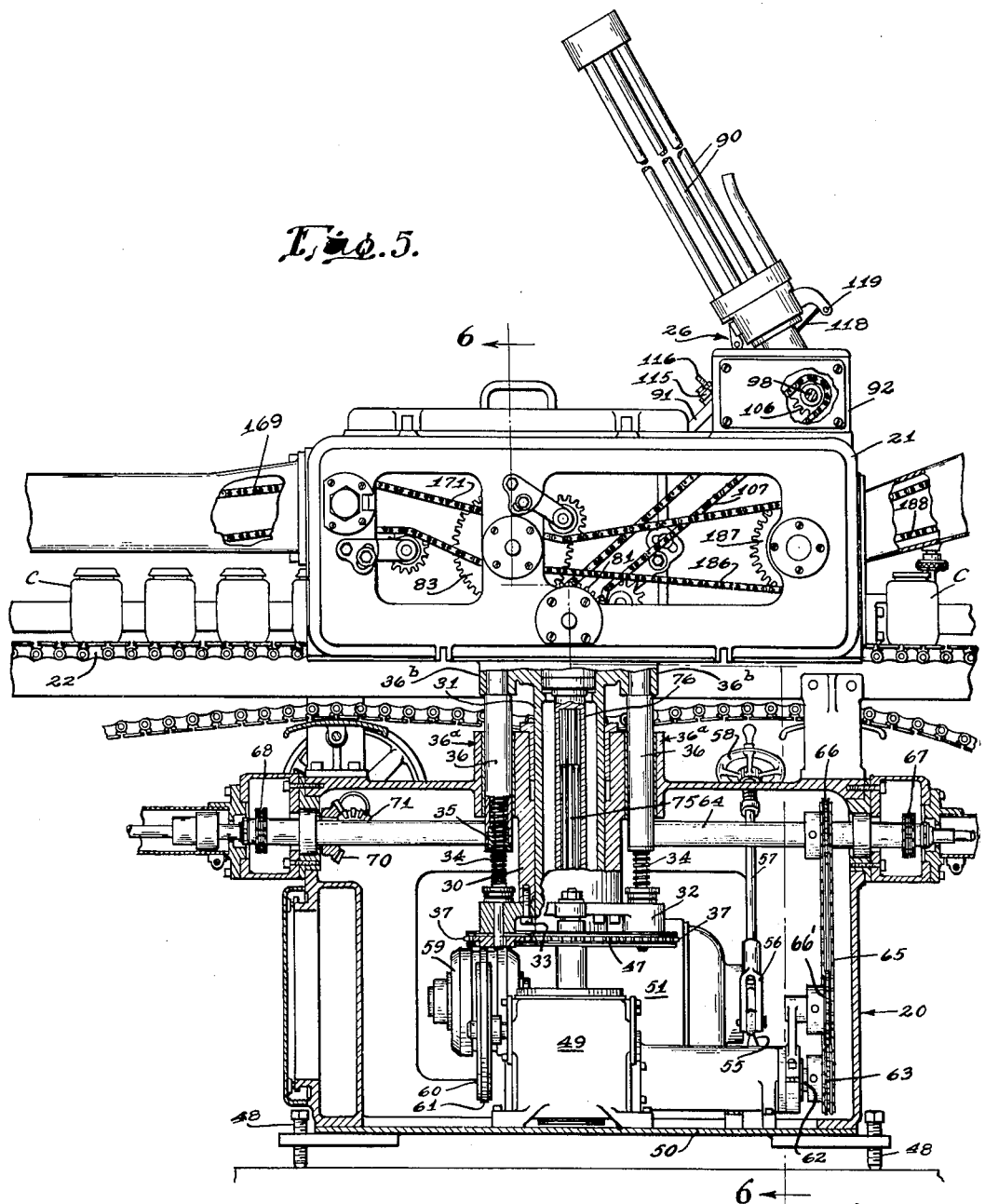

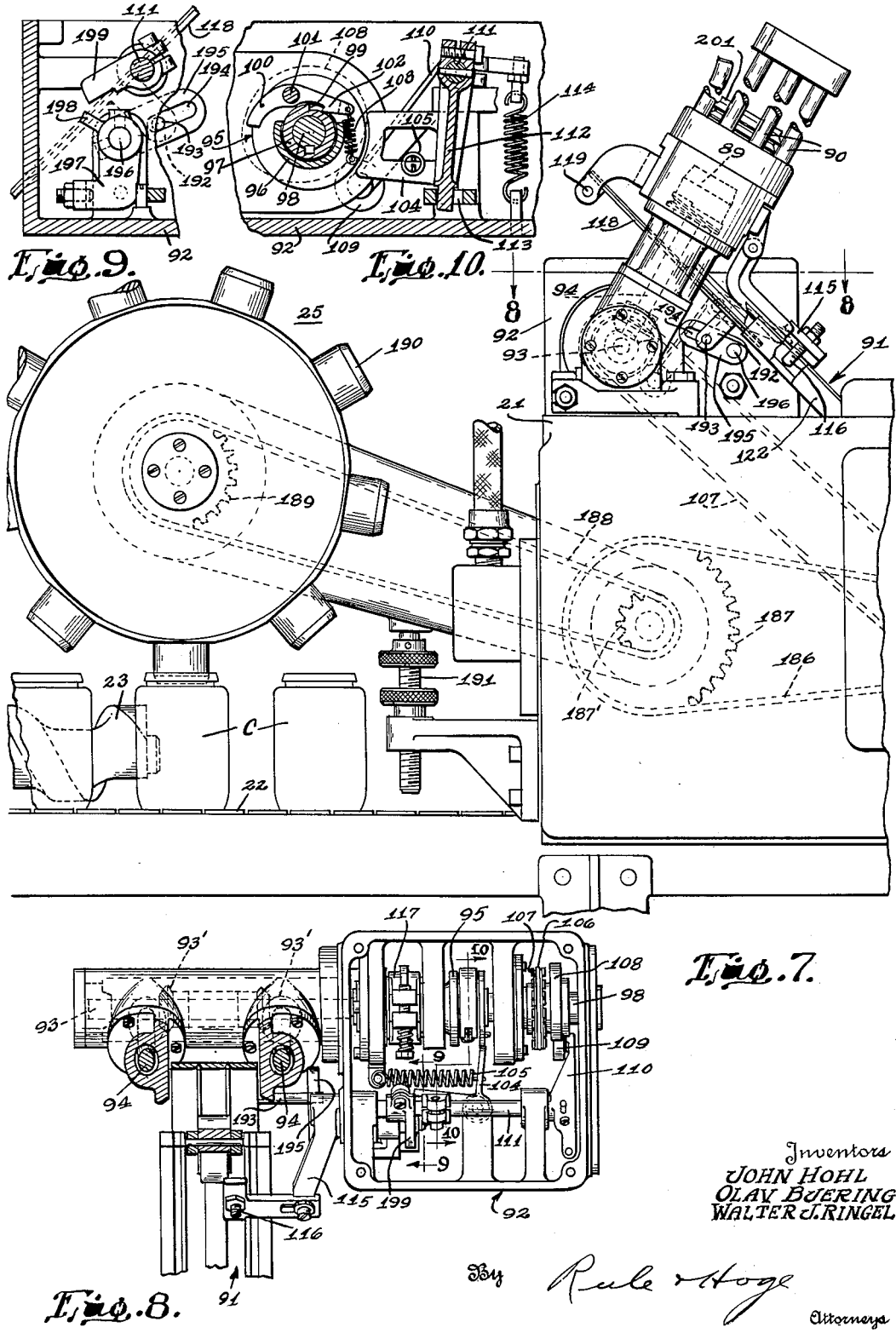

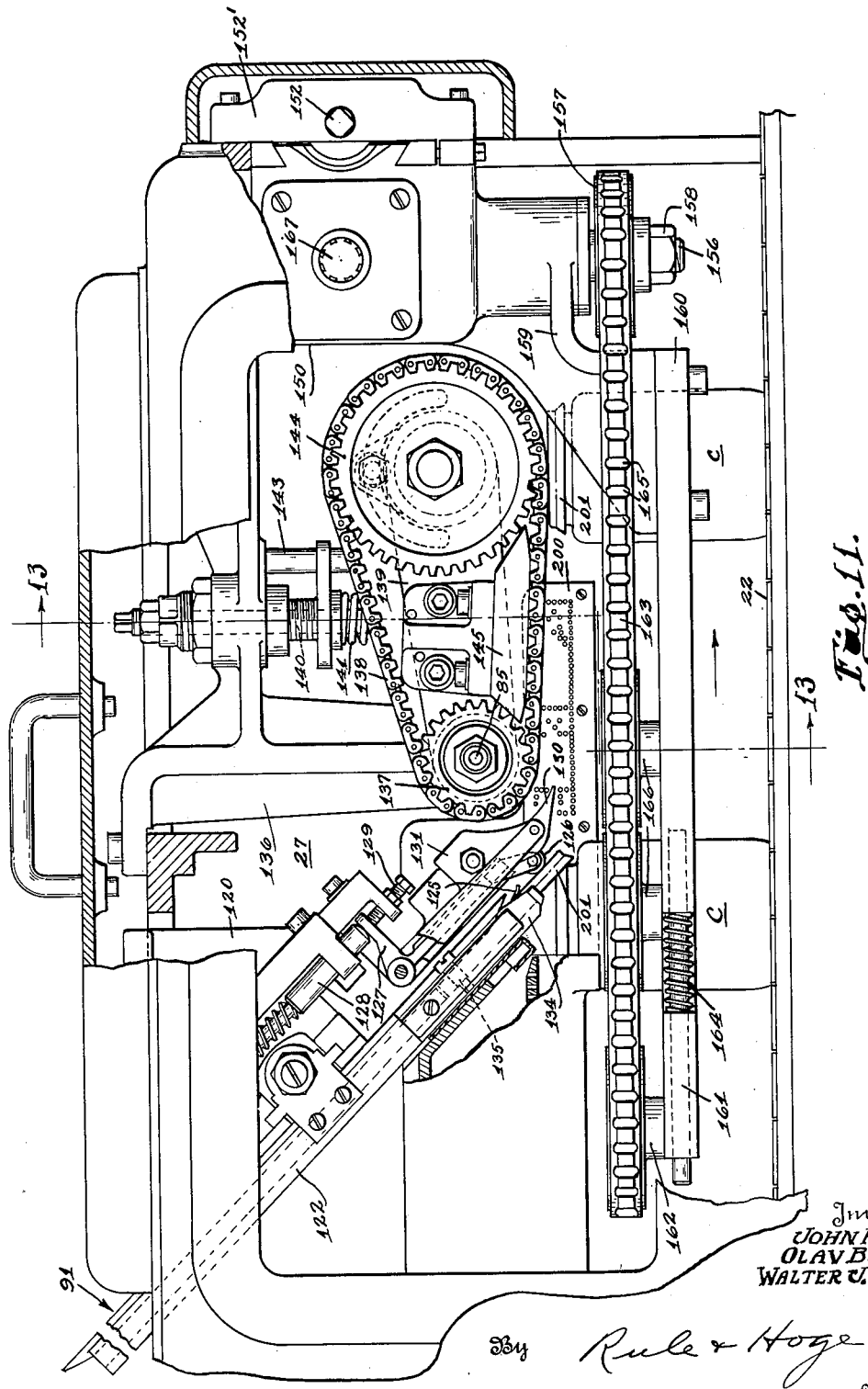

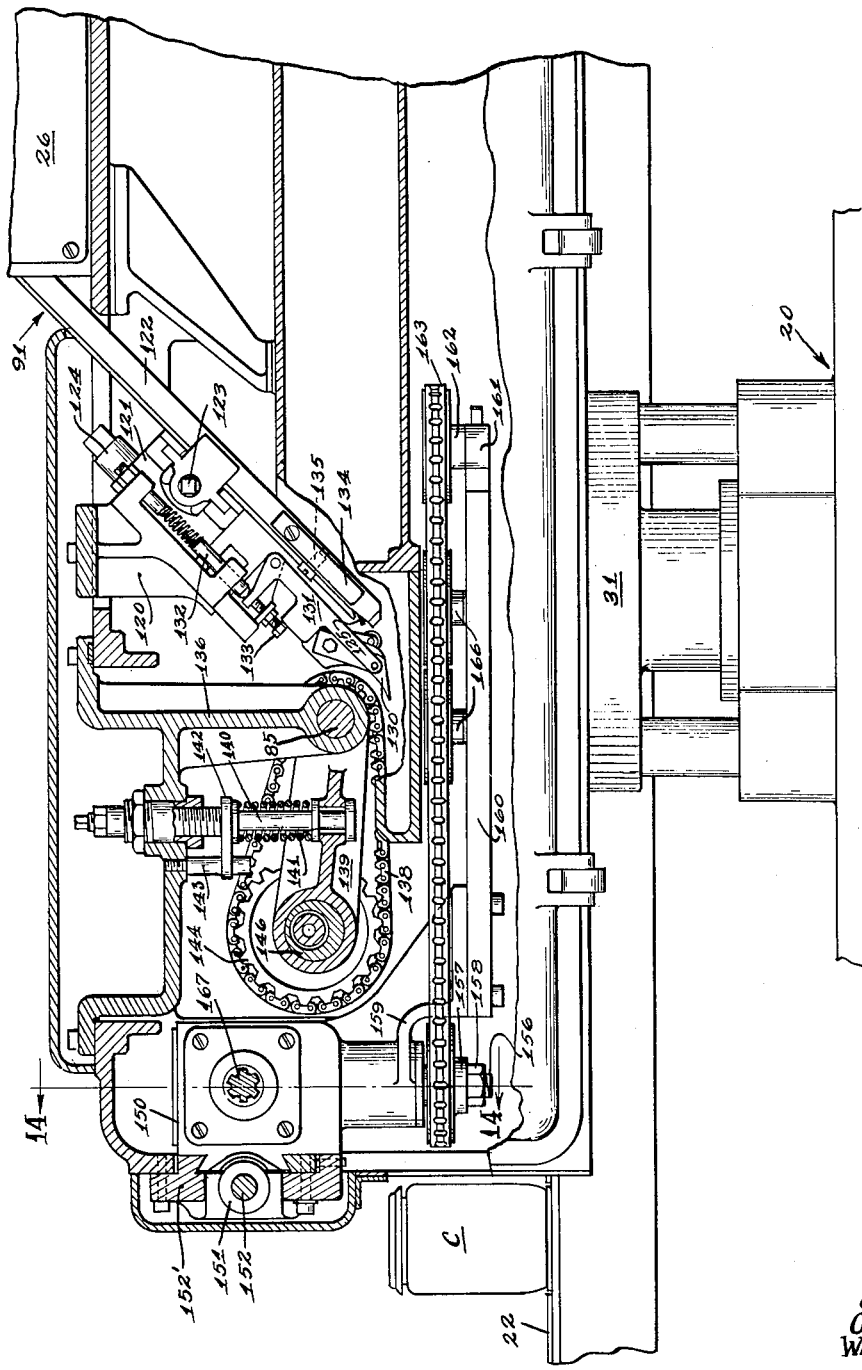

Inventors
JOHN HOHL
OLAV BJERING
WALTER V. RINGEL
By Rule & Hoge
Attorneys

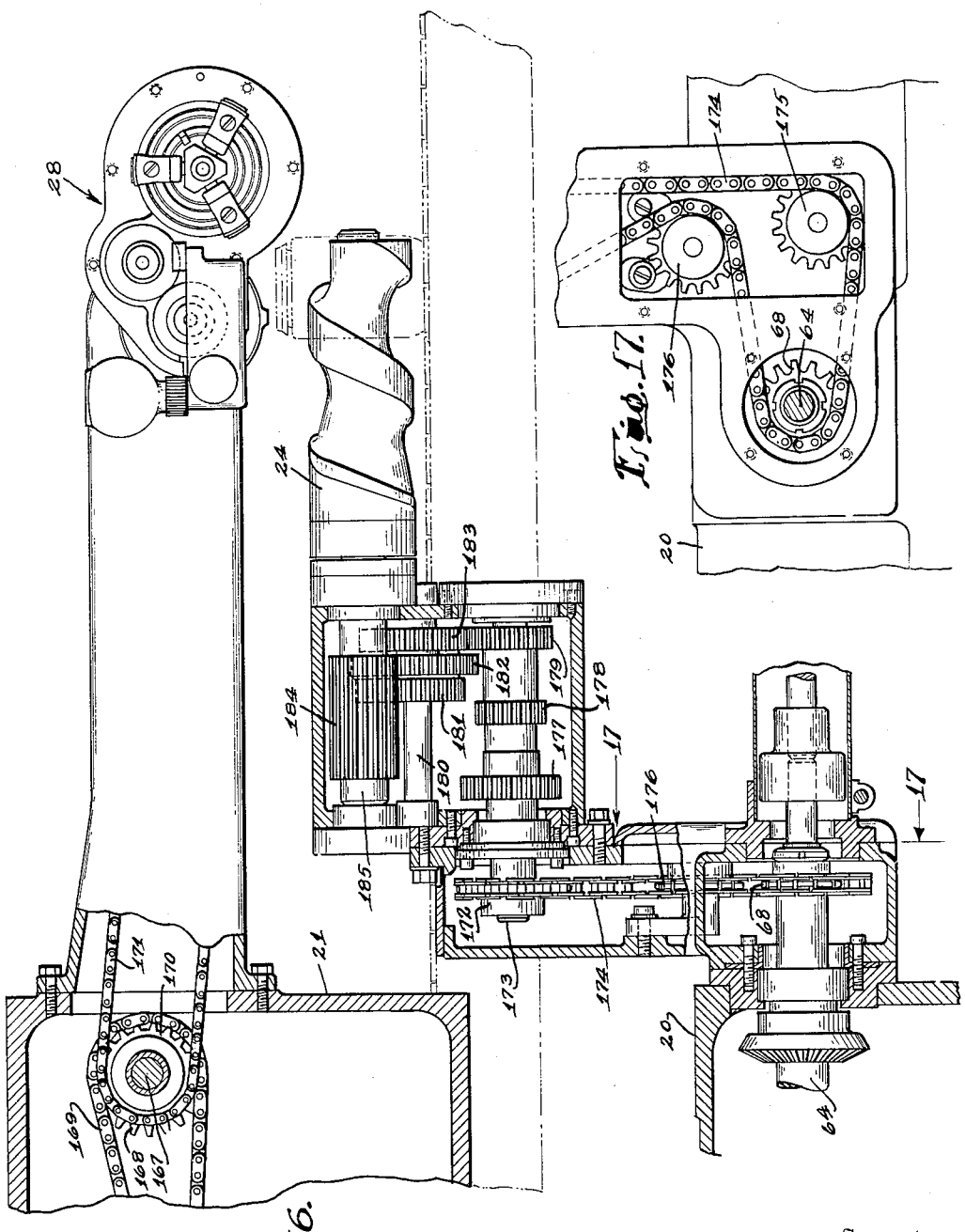

United States Patent Office 2,735,600
Patented Feb. 21, 1956

2,735,600

APPARATUS FOR SEALING CONTAINERS

John Hohl, Olav Bjering, and Walter J. Ringel, Toledo, Ohio, assignors to Owens-Illinois Glass Company, a corporation of Ohio Application August 13, 1952, Serial No. 304,092

20 Claims. (Cl. 226—82)

This invention relates to improvements in apparatus for applying closure caps to containers, more especially to glass containers.

A common principle employed in the sealing of containers is to displace the air in the container with an inert gas, or with a vapor such as steam, which, after sealing and during cooling of the container, condenses and creates a partial vacuum.

It is an object of this invention to provide an improved efficient apparatus utilizing this sealing principle.

It is a further object of the invention to provide such an apparatus which is unitary, compact, and easily adjusted to accommodate containers of different height and diameter.

Other objects of the invention will appear hereinafter.

Basically, the apparatus comprises a lower housing including the drive mechanism, conveyor, and infeed timing and spacing worms; and an upper housing including a head spacer unit, cap feed unit, sealing unit, and coder unit. The sealing unit includes pressure belt, side belt, and steam distributor mechanisms.

Referring to the accompanying drawings:

Fig. 1 is an elevational view of the apparatus;

Fig. 2 is a plan view of the apparatus;

Fig. 3 is an end view of the apparatus;

Fig. 4 is a diagrammatic plan view of a portion of the drive mechanism;

Fig. 5 is a fragmentary sectional view at the line 5—5 on Fig. 3 with the inspection cover removed;

Fig. 7 is a fragmentary view of the head spacer and cap feed mechanism;

Fig. 8 is a fragmentary sectional view at the line 8—8 on Fig. 7;

Fig. 9 is a fragmentary sectional view at the line 9—9 on Fig. 8;

Fig. 10 is a fragmentary sectional view at the line 10—10 on Fig. 8;

Fig. 11 is a part sectional view at the line 11—11 on Fig. 6, parts being broken away;

Fig. 12 is a part sectional view at the line 12—12 on Fig. 6, parts being broken away;

Fig. 16 is a fragmentary part sectional elevational view of the coder at the line 16—16 on Fig. 2; and Fig. 17 is a sectional view at the line 17—17 on Fig. 16.

Figure 6:
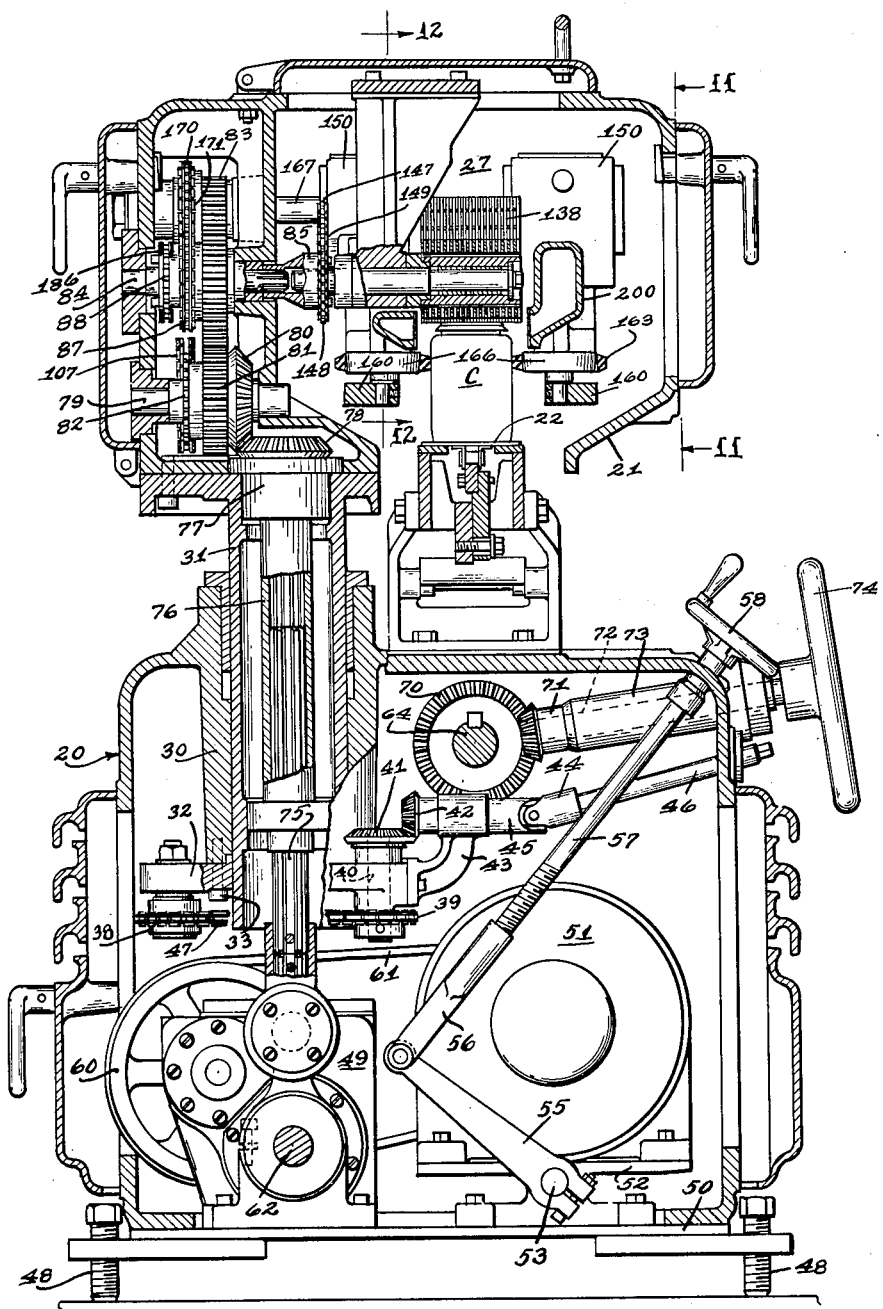
Fig. 6 is a sectional view at the line 6—6 on Fig. 5, parts being broken away.

For purposes of clarity a general description of the machine will be discussed first followed by a detailed description of the various components.

*General description*

Broadly, the apparatus comprises an endless conveyor which conveys the previously filled containers through the machine. As the containers are carried forward, they pass into a worm or helicoid which times and spaces them in relation to a headspacer unit which removes the excess contents from the containers and thereby adjusts the space between the contents and the top of the container. The containers are then carried below a cap chute unit down which caps are fed into the path of the containers. As each container passes below the discharge end of said chute, it removes a cap therefrom. As the container and cap advance, they are carried beneath a sealing unit which seals the cap to the container. Prior to and during the sealing, the containers and caps are subjected to inert gas, or vapor emanating from a distributor.

After being sealed, each container is carried into a worm which times and spaces it under a coder unit. The coder unit applies a mark to the top of the cap. The sealed and coded container is then removed from the conveyor.

Referring to Figs. 1, 2, and 3, the apparatus comprises a lower housing or base 20 and an upper housing 21. An endless conveyor 22 is mounted on the base 20.

A headspacer unit 25, a cap feed and chute unit 26, a sealing unit 27, and a coder unit 28 are mounted on the upper housing. Each of these units is mounted in such a manner that it may be individually removed as an integral unit without affecting the other units.

A worm 23 is mounted on the base and is positioned adjacent the conveyor in advance of the headspacer unit 25 and a worm 24 is mounted on the base and is positioned adjacent the conveyor in advance of the coder unit 28, for timing and spacing the containers C below the headspacer and coder units, respectively.

The drive mechanism for all the various units is housed in the base 20. The upper housing 21 is mounted for vertical adjustment relative to the base 20 and elevating means is provided for effecting such adjustment. This movement of the upper housing simultaneously adjusts the position of the various units mounted thereon, namely the headspacer unit, cap feed and chute units, sealing unit and coder unit, relative to the conveyor and worms, to accommodate containers of various sizes.

*Elevating mechanism*

The upper housing is mounted for vertical movement relative to the lower housing to accommodate containers of various sizes, and an elevating mechanism is provided to adjust the position of the upper housing relative to the lower housing.

Referring to Figs. 5 and 6, the base 20 has a central portion thereof formed with a cylindrical sleeve 30 extending vertically downward. The upper housing 21 is formed with a hollow column 31 which projects downwardly and is telescoped within the sleeve 30 for vertical movement therein incident to adjustment of the upper housing relative to the base. A bracket 32 is secured to the base of the sleeve 30 by bolts 33 and in part carries the elevating mechanism. Two elevating screws 34 are journaled in the bracket 32 and are threaded to nuts 35 which are provided at the lower end of vertical sleeves 36. The sleeves 36 project downwardly through guides 36$^a$ in the base 20 and are secured at their upper ends in bosses 36$^b$ at the upper end of the hollow column 31. Sprockets 37 are mounted on the lower ends of the elevating screws 34 (Fig. 5). An idler sprocket 38 is also mounted on the bracket 32. A fourth sprocket 39 is mounted on the bracket 32 and includes a short shaft 40 on which a miter gear 41 is secured. A second miter gear 42 meshes with gear 41 and is held in position by a small mounting bracket 43. A universal joint 44 connects shaft 45, on which gear 42 is mounted, to a rod 46. Rod 46 extends through the wall of the base 20. A chain 47 is trained over the sprockets so that all of these sprockets may be driven in unison.

When it is desired to adjust the position of the upper housing, a crank (not shown) may be attached to rod 46. Rotation of the rod will rotate miter gears 41 and 42, and in turn, drive the chain and cause the elevating screws to rotate and be displaced relative to nuts 35 in said sleeves 36 and thereby change the vertical position of the upper housing 21 and the various mechanisms mounted thereon relative to the main conveyor 22 and base 20 to accommodate containers of various sizes.

The close proximity of the elevating screws to the main column prevents misalignment of the upper housing and the units mounted thereon due to expansion and contraction caused by the hot vapor or steam which may be used in sealing the containers.

*Drive mechanism*

All the units of the apparatus are driven from a single motor mounted in the base as presently described.

Referring to Figs. 5 and 6, the base, or lower housing 20 is supported on leveling screws 48. A gear box 49 is mounted on base plate 50 of the base 20. A motor 51 is mounted on platform 52 which is in turn mounted on a rock shaft 53 journaled on bearings in base plate 50. A lever 55 is clamped to the rock shaft 53 and a clevis 56 is pivoted to the end of lever 55. One end of a rod 57 is threaded to the clevis and the other end of the rod 57 projects through the housing 20 and is journaled therein. A hand wheel 58 is secured to the end of the rod 57.

A speed changer 59 (Fig. 5) of conventional design is mounted on the motor shaft and a pulley 60 is mounted on the gear box. A belt 61 is trained over the pulley 60 and the speed changer. By rotating the hand wheel 58, the platform 52 is moved about the axis of said rock shaft 53 causing the platform to change its position and thereby move the motor toward and from the gear box, thus changing the speed of the drive to the gear box.

A shaft 62 (Fig. 5) extends horizontally out of the gear box and a sprocket 63 is mounted thereon. A horizontal drive shaft 64 is journaled in the housing 20 above said shaft 62 and is driven by the sprocket 63 through chain 65, and sprocket 66. An idler gear 66' is mounted to remove the slack from chain 65. The shaft 64 extends through either side of the housing 20 to drive the worms 23, 24 and the conveyor 22. The worm 23 is driven by sprocket 67 on shaft 64 and worm 24 is driven by sprocket 68 on shaft 64 (Fig. 5). The shaft 64 (Fig. 1) extends to the end of the conveyor 22 and drives the conveyor through a gear, sprocket and pulley arrangement 69.

A bevel gear 70 is mounted on shaft 64 in mesh with gear 71 which in turn is mounted on shaft 72 (Figs. 5, 6). Shaft 72 is coupled to a sleeve 73 which is journaled to the housing. A hand wheel 74 is secured to the end of the shaft 72. By pushing inwardly and rotating the wheel, the position of the worms and conveyors may be changed simultaneously.

A splined shaft 75 (Fig. 6) extends vertically upwardly out of the gear box into the hollow column 31 and is meshed with a hollow splined sleeve 76 which is journaled to the upper housing 21 at 77. A miter gear 78 is mounted on the end of the sleeve 76. The various mechanisms on the upper housing 21 are driven through this drive, as presently described.

A short horizontal shaft 79 (Fig. 6) is mounted in the upper housing 20 and carries a miter gear 80 meshing with gear 78, a gear 81, and a sprocket 82.

Referring to Fig. 4 which is a diagrammatic representation of the drive in the upper housing, the sprocket 82 drives the cap feed mechanism. The gear 81 (Fig. 6) meshes with a larger gear 83 mounted on a horizontal shaft 84 which is journaled in the housing. The shaft 84 is splined to shaft 85 which drives the pressure belt mechanism 86. Sprockets 87 and 88 are also mounted on shaft 84. Sprocket 87 drives the coder 28 and side belts while sprocket 88 drives the head spacer 25, all as will be described in detail below.

*Cap feed and chute*

Referring to Fig. 7, the cap feed mechanism includes cap feed guide rods 90 for supporting and guiding a stack of caps 201 to the cap feed mechanism. The cap feed proper may comprise any satisfactory means for removing and feeding a cap from the stack of caps. Such a mechanism may preferably consist of a pair of rolls 89 such as disclosed in the patent application of E. O. Ninneman et al., Serial No. 198,461, filed November 30, 1950, entitled Cap Feeding Mechanism, now Patent No. 2,659,522, dated Nov. 17, 1953.

Means is provided so that if the chute 91 (Figs. 7, 8, 11 and 12) is full, no caps are fed from the stack to the chute. This mechanism includes a gear box 92 (Fig. 8). A shaft 93 is mounted in the gear box and drives the cap feed rolls 89 through bevel gears 93' and shafts 94 on which the rolls 89 are mounted. The shaft 93 is keyed to a pawl carrier 95 which is provided with a tubular portion 96 into which a clutch 97 projects. The clutch 97 is keyed to a shaft 98 and includes a single tooth or latch 99 on the periphery thereof (Fig. 10). The pawl carrier 95 is provided with an annular space into which pawl 100 is mounted. The pawl 100 is pivoted to the carrier at 101 and is formed with a latch portion 102 held inwardly by a spring 103. A pawl stop 104 is pivotally mounted in the gear box. A spring 105 tends to hold the pawl stop in the path of the pawl. The pawl stop 104 is actuated as presently described so that one end of the pawl stop is held inwardly and prevents the latch portion of the pawl from engaging the tooth 99 of the cap feed clutch 97.

A sprocket 106 is keyed to shaft 98 and is driven by chain 107 through sprocket 82 (Figs. 7, 8). A cam 108 is also mounted on shaft 98. A cam follower 109 and follower arm 110 are mounted on a shaft 111 which is parallel with and spaced from shaft 98. An arm 112 is mounted on shaft 111 and projects into a slot 113 on the end of pawl stop 104. A spring 114 tends to keep the cam follower 109 in contact with the cam 108, thereby causing the arm 112 to push the pawl stop 104 against the action of the pawl stop spring 105.

An arm 115 is fastened to the end of shaft 111 which projects through the gear box. The arm 115 includes a pointer 116 which projects into the path of the caps in the chute. A brake 117 is mounted on the shaft 93 to cause a positive stop in the rotation of the shaft.

As the shaft 98 is rotated by the sprocket, the cam 108 causes the arm 112 to move the pawl stop into and out of the path of the rotating pawl. Normally, when caps are being fed continuously the pawl alternately latches and unlatches the clutch causing the drive to be transmitted intermittently to shaft 93 which drives the cap feed rolls, thereby feeding the caps. However, when the cap feed chute is filled, the pointer strikes the top of a cap and holds the pawl stop in position such that the pawl is out of engagement with the clutch, stopping the feeding of the caps. As the cam continues to rotate the pointer is lifted from the cap and, if the chute has been emptied, on the next revolution the pointer does not strike a cap and the feed mechanism is permitted to feed a cap. If the chute has not been cleared, the pointer again strikes the top of the cap and the feeding of the caps is prevented.

As shown in Fig. 7, the cap feed mechanism includes a platform 118 pivoted at 119. The platform is mounted to move out of alignment with the chute when the caps accumulate thereon due to jamming of the cap chute and also to prevent further feeding of caps. The other end of the platform is formed with a bracket 192 having a pin 193 thereon extending into slot 194 of lever 195. The lever is mounted to a short shaft 196 journaled in the gear box. A detent lever 197 and locking lever 198 are also mounted on said shaft 196. The detent lever is in engagement when the platform is in up position. A lever 199 is mounted on shaft 111 and is normally moved as the caps are fed. If the platform is forced down by accumulation of caps, the pin 193 forces the lever 195 down, causing the detent lever 197 to swing out of engagement and at the same time the locking lever 198 swings up into the path of lever 199. This prevents the shaft 111 from moving thus keeping the pawl stop in engagement with the pawl, and thereby preventing the cap feed unit from feeding caps.

Referring to Figs. 11 and 12, the cap feed chute includes a mounting bracket 120 mounted in the upper housing 20. A cap shute support 121 is slidably keyed to the bracket. Chute guide rails 122 are mounted to this support through screw thread connections to a shaft 123. The threads on shaft 123 are right and left handed whereby rotation of the shaft 123 causes the rails to move inwardly or outwardly from the center to accommodate different size caps. The position of the support 121 in the direction of the length of the rails may be adjusted by screw 124.

A spring loaded arm 125 is provided at the lower end of the chute to press downwardly on the caps. A spring loaded roller 126 is also provided and is mounted on bracket 127 held under spring tension by plunger and spring 128 (Fig. 11). The fine adjustment of the position of the roller may be made by screw 129.

A tapered shoe 130 is also provided in advance of the roller to guide the caps below the sealing mechanism. The shoe 130 is mounted on bracket 131 (Fig. 12) which is held under tension by plunger and spring 132. The position of the shoe may be adjusted by screw 133.

The ends 134 of the guide rails are pivoted at 135 to permit free movement of the caps therebetween.

The cap feed unit may be removed as an integral unit by disengaging the chain 107 and removing the screws which mount the gear box 92 (Fig. 7).

The cap feed chute unit may be removed as a unit by removing the screws which fasten the bracket 120 to the upper housing (Figs. 11 and 12).

*Pressure sealing mechanism*

The sealing unit 27 comprises a pressure sealing mechanism, a side belt mechanism, and a steam distributor.

Referring to Figs. 6, 11, and 12, the means for sealing the caps to the containers includes a bracket 136 mounted on the housing 20. The bracket has the shaft 85 mounted therein. As previously stated, the shaft 85 has one end thereof splined to shaft 84. A gear 137 is journalled to shaft 85 and serves to guide the pressure belt, herein shown as a chain 138. The chain is machined and tooled so that no sharp corners or projections are exposed.

The bracket 136 also has mounted thereon a yoke 139 by means of a shaft 140, which is bolted to the bracket 136. A spring 141 forces the yoke 139 downwardly. A guide plate 142 mounted on shaft 140 and pin 143 projecting through a hole in plate 142 prevent the yoke from rotating. A gear 144 is mounted on the yoke 139 and cooperates with idler gear 137 to drive the pressure chain 138.

A plate or shoe 145 is mounted on the yoke 139 for applying a support or backing to the pressure belt. By this construction the pressure belt is permitted to yield as a cap and container pass thereunder.

The drive gear 144 over which one end of the belt is trained, is mounted upon the yoke 139 by an eccentric sleeve 146. By adjustment of the position of the sleeve 146, the position of the large gear 144 and in turn the slope of the lower reach of the pressure belt may be adjusted. A sprocket 147 (Fig. 6) is mounted on the shaft of the large gear 144 and is connected to sprocket 148 on drive shaft 85 through chain 149.

The sealing mechanism may be removed as an integral unit by removing the screws which fasten the mounting bracket 136 (Figs. 11 and 12).

*Side belt mechanism*

Figure 15:
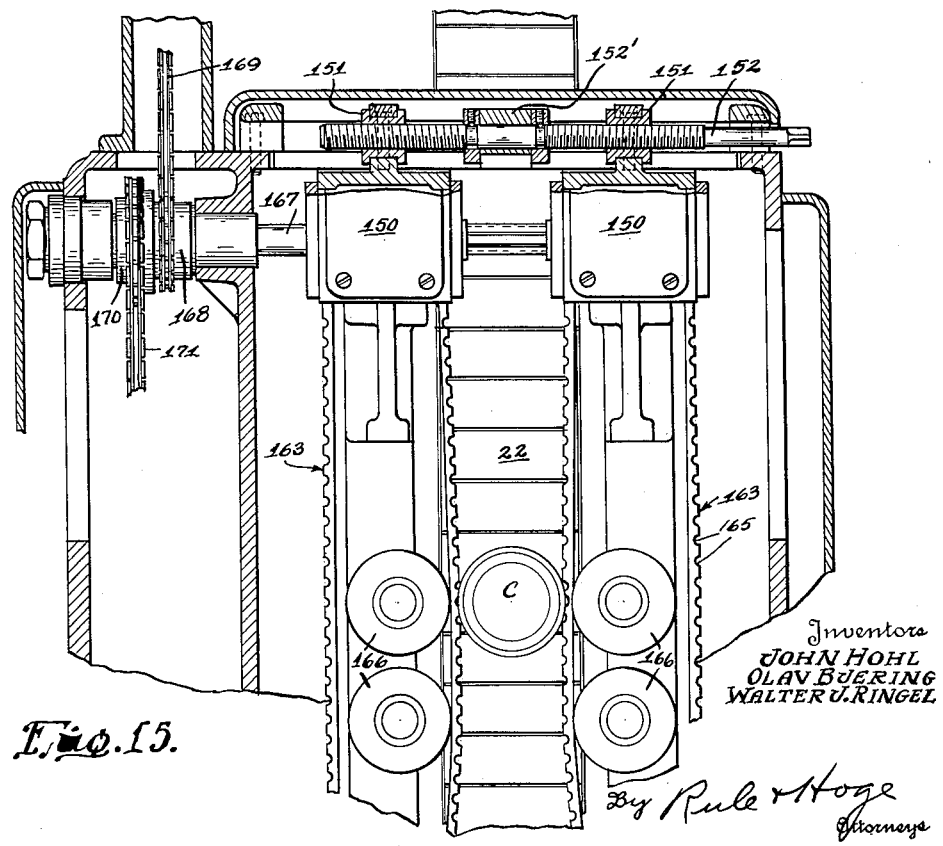
Fig. 15 is a part sectional view at the line 15—15 on Fig. 14.

Referring to Figs. 4, 11, 12, 14 and 15, a side belt mechanism is provided for guiding and steadying the containers, as they remove caps from the chute and are sealed. This mechanism comprises a pair of endless belts running continuously at the speed of the main conveyor 22 and engaging opposed sides of the containers as they pick up the caps from the cap chute and pass beneath the sealing mechanism. This includes a pair of gear boxes 150 mounted on brackets 151 threaded to shaft 152 (Fig. 15). The shaft 152 is mounted in bracket 152' which is mounted on the end of the housing. The threads on the shaft 152 are right and left handed respectively so that rotation of shaft 152 will move the boxes 150 inwardly or outwardly from the center to accommodate different diameter containers.

Each gear box 150 includes a hollow splined shaft 153 journaled therein, bevel gear 154 mounted on shaft 153, and bevel gear 155 meshed to gear 154 and journaled in the box. The gear 155 is keyed to shaft 156 which projects vertically downward out of the gear box. A pulley 157 is mounted on the end of each shaft 156 by nut 158.

A bracket 159 projects downwardly from each gear box 150 and has a horizontally and longitudinally extending arm 160 fastened thereto. The arm 160 has a spring loaded extension 161 on the end thereof (Fig. 11). A belt 163 is trained over the pulleys 157 and 162 and held in taut position by the spring 164 acting on extension 161 and pulley 162. The belt 163 is preferably formed with serrations or notches 165 in order to provide a better grip on the containers. The pulleys 157 and 162 are knurled to prevent slippage between the belts and pulleys. A positive grip of the container as the caps are applied is obtained by rollers 166 which press inwardly against the belts at the cap pickup position.

Figure 13:
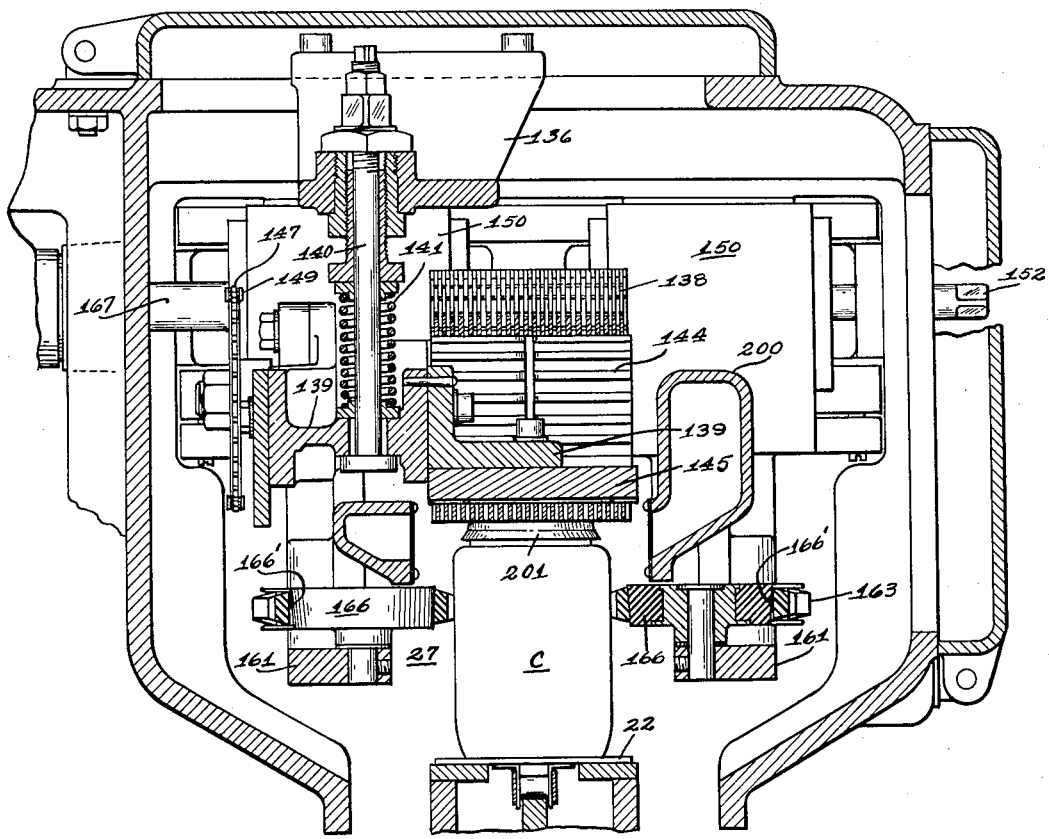
Fig. 13 is a sectional view at the line 13—13 on Fig. 11.
Figure 14:
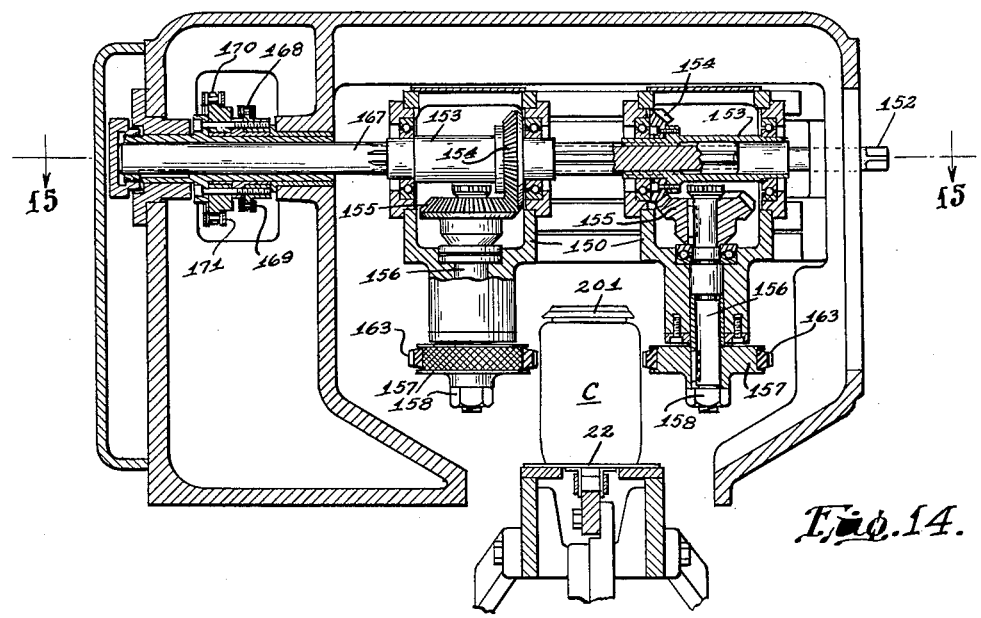
Fig. 14 is a sectional view at the line 14—14 on Fig. 12.

The rollers 166 are formed, as shown in Fig. 13, with beveled or downwardly and inwardly extending faces 166' which cause the belts to pivot downwardly when a container passes between the rolls thereby pressing the container downwardly onto the conveyor. Without the beveled faces on the belts, the containers tend to lift off of the conveyor when passing between the rolls and to rock when they contact the cap. This results in a much poorer seal and a resulting lesser vacuum. It should also be noted that the side belts form a tapered portion from the pulley 162 to the back-up rolls, permitting the jars to enter freely between the side belts.

The hollow shafts 153 are splined to shaft 167 which is rotated by sprocket 170 and chain 171 receiving drive from sprocket 87 (Fig. 4).

*Steam distributor*

A steam distributor 200 is positioned to subject the containers to inert vapor or steam as they enter between the belts, remove a cap from the chute, and are sealed. The distributor for the inert gas or vapor may be of the type shown in Hohl et al. Patent No. 2,439,773, dated April 13, 1948, or as disclosed and claimed in the patent application of John Hohl, Serial No. 210,369, filed February 10, 1951, and titled "Method and Apparatus for Sealing Containers," now Patent No. 2,630,958, dated March 10, 1953. In the latter type, the distributor includes spaced channels on either side of the path of the containers for subjecting the containers to steam or inert vapor.

The side belt mechanism may be removed as an integral unit by removing the screws which mount the bracket 152' in the end of the upper housing (Figs. 12 and 15).

*Coder and head spacer*

Referring to Figs. 4, 5, and 16, the coder is driven by sprocket 168 on shaft 167 through chain 169. The coder may be of any conventional construction which will form an imprint, or mark on the cap.

The worn 24 is driven by sprocket 68 on shaft 64 through a chain and gear linkage. As shown in Figs. 16 and 17, the chain and gear linkage includes a sprocket 68 which drives sprocket 172 on shaft 173 through chain 174 and idler gears 175 and 176. Shaft 173 has mounted thereon three gears of different sizes, 177, 178, and 179. A second shaft 180 is mounted parallel to shaft 173 and also has a gear coupling comprising three gears 181, 182, and 183 adjustably mounted thereon. By changing the position of the gear coupling, the gears 181, 182, and 183 may be caused to alternately mesh with the gears 177, 178, and 179 respectively.

The gear 183 meshes with spline gear 184 on the shaft 185 on which the worm 24 is mounted. This gear coupling provides a manually operable transmission which permits the worm to be driven at different speeds to accommodate different sized containers.

The head spacer 25 (Figs. 1, 2 and 7), which functions to remove excess contents from the container, is driven through sprocket 88, chain 186, sprockets 187, 187', chain 188, and sprocket 189. The head spacer includes a wheel having a series of head spacing members 190 thereon which project into the containers and adjust the head space thereof. A leveling and supporting screw 191 is provided to adjust the height of the head spacer. At the same time this construction permits the head spacer to pivot upwardly if it strikes the top of a container or is otherwise obstructed.

The head spacer worm 23 is driven by sprocket 67 on shaft 64 through a chain and gear arrangement similar to that described above for driving the coder worm 24.

Operation

The operation of the apparatus may be summarized as follows: The previously filled containers C are transferred to the conveyor 22 by transfer disk 29 and are carried through the machine by the conveyor.

As they are carried forward by the conveyor, the containers pass into worm 23 which times and spaces them below the head-spacer unit 25 (Fig. 7). As each container passes below the headspacer, a member 190 projects into the mouth thereof to remove excess product therefrom and create the desired headspace at the mouth of such container.

Each container is then carried below the cap chute and draws a cap 201 therefrom. As the cap is being withdrawn, it is kept in downward engagement with the container by the spring loaded roller 126 (Fig. 11). The cap is maintained in contact with the container after removal from the chute by spring loaded shoe 130, which maintains contact with the cap until it passes beneath the pressure belt 138. As the container and cap move beneath the belt 138, the cap is sealed to the container. The pressure belt is pivoted about the end thereof nearest the chute. The angle of the lower reach of the belt is adjusted by eccentric 146.

The steam distributor 200 subjects the cap and container to steam, or inert vapor, during the cap pick-up and sealing steps.

The side belts serve to positively grip and guide each container as it removes a cap from the chute and is sealed. The sloping faces 166' of the pressure rolls 166 (Fig. 13) maintain the containers against the conveyor 22 and prevent the tipping of the containers.

After being sealed, the containers are carried into worm 24 which times each jar below coder unit 28, which in turn applies a code mark to the top of each cap.

The sealed and coded container may then be conveyed through a washer unit and finally removed by transfer disk 29.

Each of the units including the cap feed unit, cap chute unit, sealing unit, and side belt mechanism may be removed as an integral unit for replacement, adjustment, or repair without affecting the other units.

Modifications may be resorted to within the spirit and scope of the appended claims.

We claim:

1. In a container sealing apparatus, the combination of a base, an upper housing mounted for vertical displacement relative to the base, a horizontally traveling endless conveyor mounted on said base for carrying containers in a substantially straight line below a series of operating units including a headspacer mounted on said upper housing above the conveyor and having headspacer units adapted to enter the mouths of the containers, a worm mounted on said base adjacent to the conveyor and in advance of the headspacer for timing and spacing the containers below the headspacer, a cap feed unit mounted on said upper housing and including a chute extending downwardly and inclined toward the direction of travel of the containers, a sealing unit mounted on said upper housing for sealing the caps to the containers, a coder mounted on said upper housing and constructed and arranged to apply a code mark to the caps of the sealed containers, a second worm mounted on the base adjacent to the conveyor and in advance of the coder for timing and spacing the containers below the coder, means for displacing the upper housing vertically relative to the base thereby simultaneously adjusting the position of the various units on the upper housing relative to the units on the base, means mounted in said base for driving the various components on the base and the upper housing, and interconnecting means between said driving means and the various units.

2. The combination set forth in claim 1, said means for displacing the upper housing vertically relative to the base comprising a pair of relatively closely spaced vertical elevating screws positioned longitudinally of the conveyor, said screws being journaled in said base and screwed into portions of the upper housing, and means for simultaneously rotating said screws for displacing the upper housing relative to the base.

3. The combination set forth in claim 2, said means for simultaneously rotating said screws comprising a sprocket mounted on each screw, a chain trained over the sprockets, and means for moving said chain to thereby rotate the sprockets.

4. In a container sealing apparatus, the combination of a base, an upper housing mounted for vertical displacement relative to the base, said base being formed with a downwardly extending cylindrical opening, said upper housing being formed with a hollow cylindrical sleeve projecting downwardly into the opening in said base thereby providing a vertically sliding relationship between said housing and base, means for supporting and displacing the upper housing relative to the base, a horizontally traveling endless conveyor mounted on said base for carrying containers in a substantially straight line below a series of operating units including a headspacer mounted on said upper housing above the conveyor and having headspacer units adapted to enter the mouths of containers, a worm mounted on said base adjacent to the conveyor and in advance of the headspacer for timing and spacing the containers below the headspacer, a cap feed unit mounted on said upper housing and including a chute extending downwardly and inclined toward the direction of travel of the containers, a sealing unit mounted on said upper housing for sealing the caps to the containers, a coder mounted on said upper housing and constructed and arranged to apply a code mark to the caps of the sealed containers, a second worm mounted on the base adjacent to the conveyor and in advance of the coder for timing and spacing the containers below the coder, a motor mounted on said base, means interconnecting said motor to said conveyor and worms for driving said conveyor and worms, and means interconnecting said motor and the units on said upper housing, said latter means extending upwardly through the hollow sleeve of said upper housing.

5. The combination set forth in claim 4, said means for supporting and displacing the upper housing relative to the base comprising a pair of vertical elevating screws journaled in said base and screwed into portions of the upper housing, said screws positioned on either side of the hollow sleeve in close proximity thereto and lying in a plane parallel to the direction of travel of the conveyor, and means for simultaneously rotating said screws.

6. In a container sealing apparatus, the combination of a base, an upper housing, a horizontally traveling endless conveyor mounted on said base for conveying containers in a straight line through the apparatus, a worm mounted on said base adjacent to the conveyor and in advance of the headspacer for timing and spacing the containers below the headspacer, a cap feed unit removably mounted as an integral unit on said upper housing, a cap chute unit removably mounted in said housing and extending downwardly and inclined toward the direction of travel of the containers, a sealing unit removably mounted as an integral unit on said upper housing for sealing the caps to the containers, means for guiding the containers as they pass below the cap chute unit and the sealing unit, said means being removably mounted as an integral unit in the upper housing, a coder mounted on said upper housing and constructed and arranged to apply a code mark to the caps of the sealed containers, a second worm mounted on the base adjacent to the conveyor and in advance of the coder for timing and spacing the containers below the coder, means for displacing the upper housing vertically relative to the base thereby simultaneously adjusting the position of the various units on the upper housing relative to the units on the base to accommodate containers of various sizes, means mounted in said base for driving the various components on the base and the upper housing, and interconnecting means between said driving means and the various units.

7. The combination set forth in claim 6, said sealing unit including a bracket removably mounted in said upper housing, an endless belt, an endless belt support including at least two rollers over which the belt is trained, said support being pivotally mounted on said bracket at one end thereof, the other end of said support being free to move in an arcuate path with the first end as a radius, means for limiting the downward movement of said support, and a plate providing a backing for the belt as it presses downwardly on the cap.

8. The combination set forth in claim 6, said means for guiding the containers below the cap chute and sealing unit comprising a bracket removably mounted in said upper housing, horizontally traveling endless belts, means for mounting said belts to said bracket adjacent to the conveyor for guiding the containers below the cap chute and the sealing unit, means for simultaneously adjusting the distance between the belts to accommodate containers of different diameters.

9. In a machine of the character described, an elongated base member, a horizontal conveyor extending along and carried by said base member to convey containers in a straight line through the machine, container steadying mechanism associated with the conveyor for a part of its length, a motor on the base member, a power shaft extending lengthwise of and carried by the base member, operating connections between said motor and shaft, driving connections between the shaft and the conveyor and container steadying mechanism, a unit arranged above said base, a cap delivery means, a cap affixing mechanism and a steam distributor carried by said unit, and driving connections between said shaft and the cap affixing mechanism.

10. In a machine of the character described, an elongated base member, a horizontal conveyor extending along and carried by said base member to convey containers in a straight line through the machine, container steadying mechanism associated with the conveyor for a part of its length, a motor on the base member, a power shaft extending lengthwise of and carried by the base member, operating connections between said motor and shaft, driving connections between the shaft and the conveyor and container steadying mechanism, a unit arranged above said base, a cap delivery means, a cap affixing mechanism and a steam distributor carried by said unit, driving connections between said shaft and the cap affixing mechanism, and means for moving said unit vertically relative to the base member to thereby adjust the relationship between the conveyor and cap affixing mechanism to accommodate containers of different heights.

11. In a machine of the character described, an elongated base member, a horizontal conveyor extending along and carried by said base member to convey containers in a straight line through the machine, container steadying mechanism associated with the conveyor for a part of its length, a motor on the base member, a power shaft extending lengthwise of and carried by the base member, operating connections between said motor and shaft, driving connections between the shaft and the conveyor and container steadying mechanism, a unit arranged above said base, a head spacing mechanism, cap delivery means, a cap affixing mechanism and a steam distributor carried by said unit, and driving connections between the said shaft and the cap affixing mechanism and the head spacing mechanism.

12. In a machine of the character described, an elongated base member, a horizontal conveyor extending along and carried by said base member to convey containers in a straight line through the machine, container steadying mechanism associated with the conveyor for a part of its length, a motor on the base member, a power shaft extending lengthwise of and carried by the base member, operating connections between said motor and shaft, driving connections between the shaft and the conveyor and container steadying mechanism, a unit arranged above said base, a head spacing mechanism, cap delivery means, a cap affixing mechanism and a steam distributor carried by said unit and driving connections between the said shaft and the cap affixing mechanism and head spacing mechanism, means for moving said unit vertically relative to the base member to thereby adjust the relationship between the conveyor and the mechanisms mounted on the unit to accommodate containers of different heights.

13. In container sealing apparatus, the combination of a horizontally traveling endless conveyor, a chute extending downwardly and inclined toward the direction of travel of the conveyor, means for supporting a stack of caps, means for feeding caps from said stack to the inclined chute, drive means for said latter cap feeding means, a clutch interposed between the drive means and the cap feeding means, a detector arm mounted for pivoted movement into and out of the path of the caps on the chute, means controlled by the said arm and operable to prevent the clutch from engaging when it strikes a cap in the chute, thereby preventing caps from being fed to said chute, said chute having a portion thereof adjacent to said cap feeding means mounted to pivot downwardly in case caps are jammed in the chute, and means operated by said pivoting movement to prevent engagement of the clutch thereby preventing caps from being fed to the chute.

14. In an apparatus for sealing caps to containers wherein the containers are moved along a horizontally travelling conveyor and a force is applied to the top of the caps to seal them to the containers, the means for applying force to the caps comprising an endless pressure belt, a support for said endless belt, means for mounting said support for pivoting movement about one end thereof nearest the oncoming caps and containers, the other end of said support being free, and a plate providing a backing for the belt as it presses downwardly on the caps.

15. An apparatus for sealing caps to containers comprising a horizontally travelling endless conveyor for conveying containers, a chute extending downwardly and inclined toward the direction of travel of the conveyor for guiding caps into the path of the containers, means on the lower end of said chute for insuring the positive positioning of the caps on the containers, means adjacent the end of the chute for applying a force to said cap and container to seal the cap to the container, and horizontally travelling endless belts mounted adjacent the conveyor for guiding the container below the cap chute and the means for forcing the caps on the containers, said belts extending from a point in advance of the lower end of the chute to a point beyond the means for forcing the caps on the containers, said belts being formed with serrations on the exposed faces thereof.

16. The apparatus set forth in claim 15, including spaced pulleys mounted on either side of said conveyor with their axes in a vertical direction, the endless belts being trained over said pulleys, means for driving said pulleys, and rubber rolls mounted between said pulleys and pressing said belts inwardly to grip and guide the containers as they pass below the cap chute and the means for forcing the caps on the containers, said rubber rolls have the faces thereof lying in a plane at an acute angle to the vertical such that the belts are caused to press downwardly and retain the containers on the conveyors.

17. The apparatus set forth in claim 16 including means for simultaneously adjusting the position of said pulleys on either side of said conveyor thereby adjusting the distance between the belts to accommodate containers of different diameters.

18. In an apparatus for sealing caps to containers wherein the containers are moved along a horizontally traveling conveyor and a force is applied to the top of the caps to seal them to the containers, the means for applying force to the caps comprising an endless pressure belt, a support for said endless belt, means for mounting said support for pivoting movement about one end thereof nearest the oncoming caps and containers, the other end of said support being free, and a plate providing a backing for the belt as it presses downwardly on the caps, said free end of the endless pressure belt support being mounted on an eccentric whereby the inclination of the belt may be changed.

19. The apparatus set forth in claim 15 including a rubber roll mounted within each said endless belt with the axis thereof extending vertically, said rubber roll pressing said belt inwardly toward the conveyor to grip and guide containers as they pass below the cap chute and the means for forcing the caps on the containers.

20. The apparatus set forth in claim 19, said rubber rolls having the faces thereof tapered downwardly and inwardly toward their axes, thereby causing the belts to press downwardly on the containers and retain them on the conveyors.

References Cited in the file of this patent

UNITED STATES PATENTS

| | | |
|---|---|---|
| 2,074,815 | Tevander et al. | Mar. 23, 1937 |
| 2,139,573 | Booth | Dec. 6, 1938 |
| 2,256,415 | Stewart | Sept. 16, 1941 |
| 2,311,707 | Stewart | Feb. 23, 1943 |
| 2,386,797 | Hohl et al. | Oct. 16, 1945 |
| 2,433,549 | Enkur et al. | Dec. 30, 1947 |
| 2,439,773 | Hohl et al. | Apr. 13, 1948 |
| 2,471,098 | Davies | May 24, 1949 |
| 2,510,568 | Fouse | June 6, 1950 |
| 2,518,857 | Bell | Aug. 15, 1950 |
| 2,522,437 | Enkur | Sept. 12, 1950 |
| 2,529,199 | Stover | Nov. 7, 1950 |
| 2,574,771 | Zimmermann et al. | Nov. 13, 1951 |